United States Patent
Shetty

(10) Patent No.: US 11,271,881 B2
(45) Date of Patent: Mar. 8, 2022

(54) INTEGRATION OF AN EMAIL CLIENT WITH HOSTED APPLICATIONS

(71) Applicant: VMware, Inc., Palo Alto, CA (US)

(72) Inventor: Rohit Pradeep Shetty, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/355,522

(22) Filed: Jun. 23, 2021

(65) Prior Publication Data

US 2022/0038400 A1 Feb. 3, 2022

Related U.S. Application Data

(62) Division of application No. 17/030,419, filed on Sep. 24, 2020, now Pat. No. 11,108,714.

(30) Foreign Application Priority Data

Jul. 29, 2020 (IN) .............................. 202041032533

(51) Int. Cl.
| | | |
|---|---|---|
| H04L 12/58 | (2006.01) | |
| G06K 9/00 | (2006.01) | |
| H04L 51/046 | (2022.01) | |
| H04L 51/00 | (2022.01) | |
| H04L 51/10 | (2022.01) | |
| H04L 51/42 | (2022.01) | |

(52) U.S. Cl.
CPC ........ *H04L 51/046* (2013.01); *G06K 9/00456* (2013.01); *H04L 51/10* (2013.01); *H04L 51/14* (2013.01); *H04L 51/22* (2013.01)

(58) Field of Classification Search
CPC ....... H04L 51/046; H04L 51/10; H04L 51/14; H04L 51/22; G06K 9/00456
See application file for complete search history.

(56) References Cited

U.S. PATENT DOCUMENTS

| | | | | |
|---|---|---|---|---|
| 2005/0021636 | A1* | 1/2005 | Kumar | G06Q 10/107 709/206 |
| 2006/0059234 | A1* | 3/2006 | Atchison | H04L 51/08 709/206 |
| 2007/0043866 | A1* | 2/2007 | Garbow | G06Q 10/107 709/226 |
| 2008/0050019 | A1* | 2/2008 | Morohoshi | G06K 9/03 382/187 |
| 2008/0183533 | A1* | 7/2008 | Raffel | G06Q 30/0201 705/7.11 |
| 2009/0276708 | A1* | 11/2009 | Smith | G06Q 50/16 715/716 |

(Continued)

*Primary Examiner* — Sargon N Nano
(74) *Attorney, Agent, or Firm* — Thomas Horstemeyer, LLP

(57) ABSTRACT

Disclosed are various embodiments for integrating an email client with hosted applications. An email is received from an email client. An image that is a component of the email is identified and sent to an optical character recognition (OCR) service. Extracted text is received from the OCR service. A request for an action object is then sent to a connector for an application, the action object representing a potential action that could be performed with the application based on the extracted text from the OCR service. The action object is then sent to the email client, which is configured to display a prompt allowing a user to perform the action represented by the action object.

18 Claims, 11 Drawing Sheets

(56) References Cited

U.S. PATENT DOCUMENTS

| | | | | |
|---|---|---|---|---|
| 2012/0041912 | A1* | 2/2012 | Mitra | G16B 5/00 |
| | | | | 706/13 |
| 2013/0041912 | A1* | 2/2013 | Arora | G06F 16/21 |
| | | | | 707/769 |
| 2013/0097618 | A1* | 4/2013 | Han | H01L 23/473 |
| | | | | 719/318 |
| 2013/0182889 | A1* | 7/2013 | Ovando | B07C 3/20 |
| | | | | 382/102 |
| 2013/0262590 | A1* | 10/2013 | Patil | G06Q 10/107 |
| | | | | 709/206 |
| 2015/0220866 | A1* | 8/2015 | Mihara | G06Q 10/06 |
| | | | | 705/7.26 |
| 2016/0140415 | A1* | 5/2016 | Lerios | H04N 19/27 |
| | | | | 382/165 |
| 2016/0342571 | A1* | 11/2016 | Lane | H04L 51/36 |
| 2020/0053127 | A1* | 2/2020 | Brotherton | H04L 63/02 |

* cited by examiner

To:

CC:

Subj:

1. Person A (sugg1@email.com) – Team Lead

2. Person B (sugg2@email.com) – Reported Issue

3. Person 3 (sugg3@email.com) – Senior Reviewer

Hi Jane

I just want onal
issues o 89.
Otherwise, please let me know if we can close this out.

Best,

-John Q. Public

FIG. 5

INTEGRATION OF AN EMAIL CLIENT WITH HOSTED APPLICATIONS

CROSS-REFERENCE TO RELATED APPLICATIONS

This application is a divisional of copending U.S. patent application Ser. No. 17/030,419, entitled "INTEGRATION OF AN EMAIL CLIENT WITH HOSTED APPLICATIONS" and filed on Sep. 24, 2020, which claims priority to and the benefit of Indian Patent Application Serial No. 202041032533, entitled "INTEGRATION OF AN EMAIL CLIENT WITH HOSTED APPLICATIONS" and filed on on Jul. 29, 2020, each of which is herein incorporated in its entirety by reference for all purposes.

This application is further related to copending U.S. patent application Ser. No. 17/030,444, entitled "INTEGRATION OF CLIENT APPLICATIONS WITH HOSTED APPLICATIONS" and filed on Sep. 24, 2020, which claims priority to and the benefit of Indian Patent Application Serial No. 202041032532, entitled INTEGRATION OF CLIENT APPLICATIONS WITH HOSTED APPLICATIONS" and filed on Jul. 29, 2020, each of which is herein incorporated in its entirety by reference for all purposes.

BACKGROUND

Users often interact with software or platforms hosted by third parties. Such services are often referred to as software-as-a-service (SAAS) or as a platform-as-a-service (PAAS). Moreover, these services often send notifications to a user when an action needs to be performed, such as through an email. For example, a bug, issue, or problem report tracker may send regular emails to a user notifying them when a new issue has been created or when an update to an existing issue has been submitted. As another example, a customer relationship manager (CRM) service may send emails to remind a user to take some action (e.g., respond to a customer) or to notify a user that information stored by the CRM service has changed (e.g., contact information for a primary point of contact with a customer has been updated). However, switching tasks from an email client to the SAAS or PAAS application can take a significant amount of time and can be cumbersome in certain contexts, such as a user working on a mobile device where multi-tasking is limited.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 5 is a pictorial diagram of an example user interface rendered by a client in the network environment of FIG. 1 according to various embodiments of the present disclosure.

DETAILED DESCRIPTION

Disclosed are various approaches for improving a user experience when working with hosted applications. When a user receives a notification, such as an email, from a hosted application, the user can be presented with a prompt within his or her email client to take an action. The action that the user is prompted to take can be determined based on the content of the message received and the source of the message. For example, a bug or issue tracker could send an email notifying the user that some has submitted a patch to resolve the problem. Accordingly, the email client could generate a prompt to allow the user to close the issue or mark it as resolved without having to leave the context of the email client. Should the user choose to mark the issue as resolved, the email client could send a message to the bug or issue tracker identifying the matter and including an indicator to mark it as resolved. Other applications that send email notifications to users could have similar functionality provided for by the email client.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
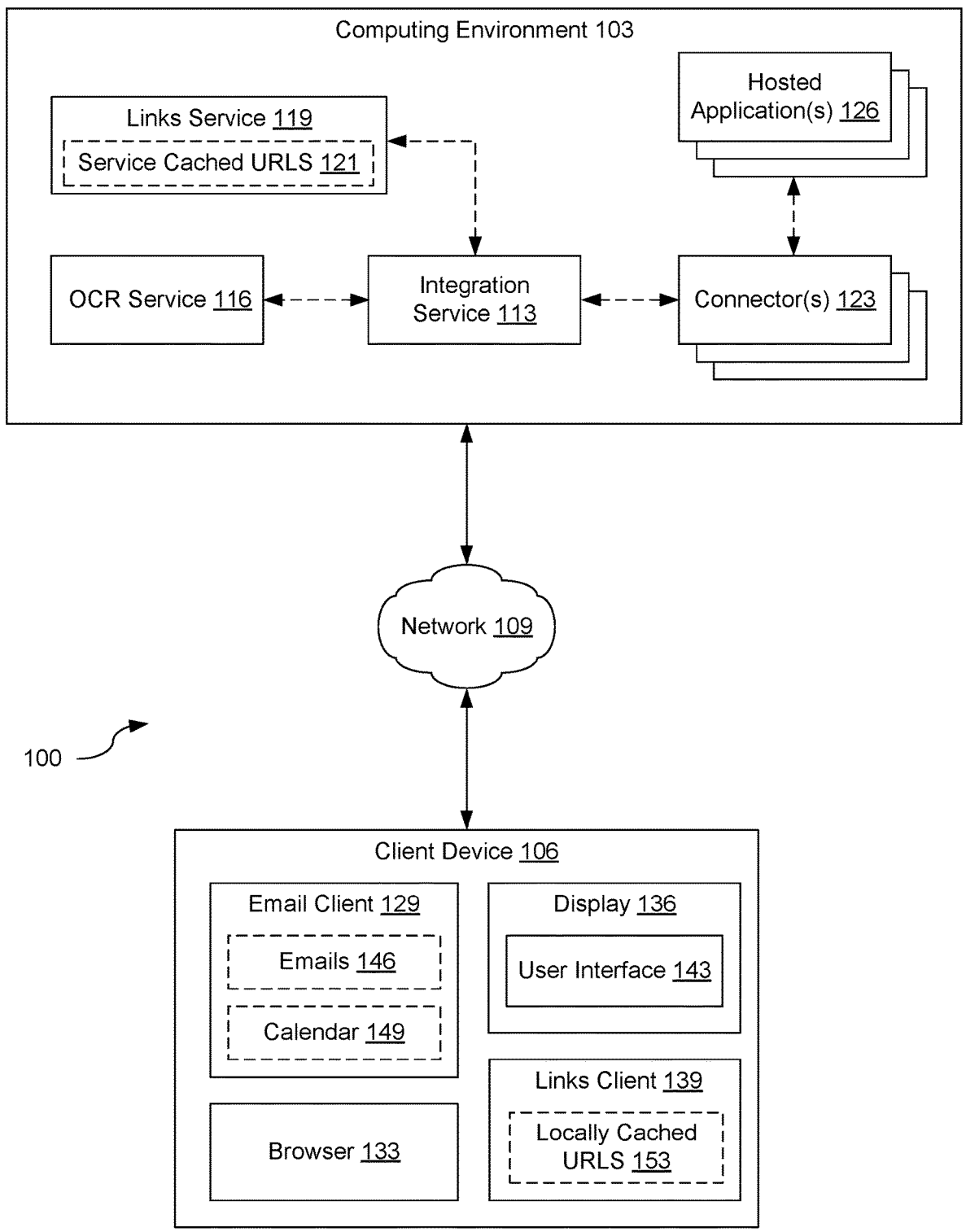
FIG. 1 is a drawing of a network environment according to various embodiments of the present disclosure.

With reference to FIG. 1, shown is a network environment 100 according to various embodiments. The network environment 100 can include a computing environment 103 and a client device 106, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include an integration service 113, an optical character recognition (OCR) service 116, a links service 119, one or more connectors 123, and one or more hosted applications 126, and other applications, services, processes, systems, engines, or functionality not discussed in detail herein.

The integration service 113 can be executed to integrate client applications, such as an email client 129 or a browser 133, with the functionality provided by hosted applications 126. For example, the integration service 113 could facilitate an email client 129 allowing a user to manipulate data or perform an action with a hosted application 126 from within the user interface of the email client 129. As a result, a user of the client device 106 does not have to leave the context or user interface of the email client 129 to interact with a hosted application 126. One example of an integration service 113 is VMWARE's MOBILE FLOWS service.

The OCR service 116 can be executed to perform optical character recognition of images or other data provided to the OCR service 116. For example, the integration service 113 could provide an image embedded in or attached to an email to the OCR service 116. The OCR service 116 could perform OCR on the image and return the resulting text to the integration service 113, which the integration service 113 could then use to perform its functions. Although the OCR Service 116 is depicted as being executed separately from the integration service 113 for clarity, it may also be implemented as a component of the integration service 113 in some implementations of the present disclosure.

The links service 119 can be executed to provide URLs to a browser 133 in response to a request from an application executing on the client device 106 or another application executing in the computing environment 103 (e.g., the integration service 113). This could include providing one or more service cached URLs 121 or one or more URLs specified by a connector 123. The service cached URLs 121 can represent one or more URLs that have been previously provided to a client device 106 in response to a request for a URL. A URL can also be provided by a connector 123 as discussed later. Although the links service 119 is depicted as being executed separately from the integration service 113 for clarity, it may also be implemented as a component of the integration service 113 in some implementations of the present disclosure.

A connector 123 can be executed to provide an interface between the integration service 113, the links service 119, or another service and a respective hosted application 126, thereby allowing the integration service 113 to access functionality provided by the hosted application 126. For example, a connector 123 can provide a standardized mechanism for the integration service 113 to communicate with a hosted application 126. Each hosted application 126 could provide an application programming interface (API) for communicating, querying, or otherwise interacting with the hosted application 126. The API could include methods or functions for retrieving data from a hosted application 126 or causing a hosted application 126 to perform some action. Although individual hosted application 126 may provide a different API, they may often have functions or methods that perform the same or similar operations. The connector 123 can provide a bridge, where the integration service 113 is provided with a standardized API by the connector 123. This can allow for the integration service 113 to send a single, uniformly formatted query or command to one or more connectors 123. Each connector 123 is then responsible for using the information provided in the query or command from the integration service 113 to invoke the appropriate functions provided by an API of the hosted application 126. To add support for a new hosted application 126, a new connector 123 can be created without needing to modify the integration service 113 itself. Likewise, if a change is made to the API of the hosted application 126, the connector 123 between the integration service 113 and the hosted application 126 can be updated without having to modify the integration service 113 itself.

The hosted applications 126 can be executed to provide various functionality for users. Often, the hosted applications 126 are implemented as web or web-based applications, where a user can access the functionality provided by the hosted application 126 through a browser 133. However, hosted applications 126 may also provide an API to allow for programmatic interaction with the data, features, or functionality provided by the hosted application 126. Examples of hosted applications 126 can include customer relationship management (CRM) applications, issue or problem report tracking applications, content management (CM) systems, web-based word processors or spreadsheets, file storage systems, web-based accounting software or systems, etc.

The client device 106 is representative of a plurality of client devices 106 that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays 136, such as liquid crystal displays (LCDs), gas plasma-based flat panel displays, organic light emitting diode (OLED) displays, electrophoretic ink ("E-ink") displays, projectors, or other types of display devices. In some instances, the display 136 can be a component of the client device 106 or can be connected to the client device 106 through a wired or wireless connection.

The client device 106 can be configured to execute various applications, such as the email client 129, the browser 133, or the links client 139. Any application executed by the client device 106 can be configured to render a user interface 143 on the display 136. The user interface 143 can include a network page, an application screen, or other user mechanism for obtaining user input.

The email client 129, which may also be referred to us a mail user agent (MUA), is an application that can be executed by a user to access, send, receive, and manage emails 146 of the user. In some instances, the emails 146 of the user may be stored locally by the email client 129. In other instances, the emails 146 may be stored remotely on a server and accessed by the email client 129. However, even if the emails 146 are stored remotely on a server, copies may still be cached locally by the email client 129 for performance reasons. In some implementations, the email client 129 may also provide calendar functionality for a user. Accordingly, the email client 129 may also store a calendar 149 for the user. The calendar 149 can track appointments, meetings, or other events on specified dates and times, provide the user with reminders of upcoming appointments, meetings, or events, and store information about the same (e.g., who is attending a meeting, who is invited to a meeting, the location of the meeting or appointment, etc.).

Although the email client 129 is described as a stand-alone executable, in some implementations the email client 129 could be implemented as the portion of a web-based mail application (e.g., "webmail") executed by the client device 106 within the browser. The email client 129 may allow for integration with the integration service 113 in various embodiments of the present disclosure.

The browser 133 represents a software application executed on the client device 106 to access and retrieve information at a specified uniform resource locator (URL). Browsers can implement one or more protocols, such as the hypertext transfer protocol or the file transfer protocol, thereby allowing users to access resources hosted on various servers using different protocols. The browser 133 can also implement a user interface 143 to display the requested resources and obtain user inputs for interacting with or requesting resources (e.g., to specify a URL). The browser 133 may be configured to interact with the integration service 113 in various embodiments of the present disclosure.

The links client 139 can be executed to provide the browser 133 with suggested URLs for resources of hosted applications 126. As a user enters text, such as a term, identifier, or beginning of a URL, the links client 139 can apply one or more regular expressions or trained machine-learning models to the text. If the regular expression or trained machine-learning model applied to the user inputted text matches a locally cached URL 153 or a service cached URL 121 maintained by the links service 119, the locally cached URL 153 or service cached URL 121 can be presented to the user a suggested URL for the user to select within the browser 133. Although the links client 139 is depicted as a separate application executed by the client device 106, it can also be implemented as a component of the browser 133 in some implementations. The locally cached URLs 153 represent one or more URLs that have been previously provided by the links service 119 to the links client 139 executing on the client device 106.

Next, a general description of the operation of the various components of the network environment 100 is provided. However, the implementations described in the following paragraphs are not the only implementations of the present disclosure. For example, more detailed descriptions of the operation of various components of the present disclosure are provide in the accompanying descriptions of FIGS. 2-10.

To begin, a user may register his or her client device 106 with the integration service 113. This may be done, for example, to allow the user to expand the capabilities of applications installed on the client device 106, such as the email client 129 or the browser 133. Accordingly, the email client 129 and browser 133 may be configured to communicate with the integration service 113 upon registration. Alternatively, the client device 106 may install a specific email client 129 or browser 133 that is configured to communicate with the integration service 113 in response to registration.

The email client 129 or the browser 133 can then subsequently communicate with the integration service 113 to extend the functionality of the email client 129 or browser 133. For example, data about user interactions with the email client 129 or the browser 133 can be provided to the integration service 113. The integration service 113 can then communicate with a connector 123 to provide the functionality of a hosted application 126 to the email client 129 or browser 133 based on the user input.

For example, the integration service 113 may provide individual emails 146 to one or more connectors 123. The connector 123 could apply a respective regular expression or trained machine-learning model to determine whether the respective hosted application 126 of the connector 123 has could perform a relevant or appropriate action on behalf of the user. As a simple example, if an email body contained a reference to a problem or bug report and contained an issue number, the connector 123 for a hosted application 126 such as a problem report or issue tracker could provide a suggestion. For example, if the email has a matter number and the word "fixed," a regular expression or trained machine-learning model provided by the connector 123 could match the body of the email to a task or action to close the bug, issue, or problem report as "resolved." The connector 123 could then provide an action object to the integration service 113 describing the potential action that could be performed by the hosted application 126, which the integration service 113 could provide to the email client 129, thereby causing the email client 129 to prompt the user to perform the action with the hosted application 126. Connectors 123 for other types of applications (e.g., account applications, customer relationship manager (CRM) applications, etc.), could provide similar types of functionality.

However, such a system may fail to work when the body of the email contains an image. For example, a screenshot might contain text that matches the regular expression or trained machine-learning model in a connector 123. However, because the text is within an image, it would be unrecognized by the regular expression or trained machine-learning model of the connector. As a simple example, a screenshot of a list of matter identifiers in a bug or issue tracker with the question "Have these been completed?" would not trigger the example regular expression or trained machine-learning model provided by the connector 123 of the issuer tracker hosted application 126 because it would not recognize the list of matter identifiers.

To address this issue, the integration service 113 can also be configured to detect whether the body of an email 146 has an image within it or, in some implementations, attached to the email 146 itself. If an image is present, the integration service 113 could first send the image to the OCR service 116. The OCR service 116 could perform optical character recognition on image and return the recognized text to the integration service 113. The integration service 113 could then forward both the text from the OCR service 116 and the email 146 itself to the connector 123 for analysis via one or more regular expressions or trained machine-learning models.

The integration service 113 could also provide one or more suggested contacts to a user of the email client 129. For example, as a user types an email, the body of the email could be provided to one or more connectors 123. However, the subject of the email or an attachment to the email could also be provided to one or more connectors 123. The individual connectors 123 could apply a regular expression or a trained machine-learning model to search for various names, titles, or other descriptions of individuals. If a match with the regular expression or trained machine-learning model occurs, the connector 123 could retrieve a list of email addresses from the respective hosted application and return them to the integration service 113, which could in turn forward them to the email client 129. The email client could then present the email addresses as suggested recipients to the user.

In addition, the integration service 113 could assist the user in adding entries or reminders to his or her calendar 149. In response to receiving an email 146 or a portion of an email 146, the integration service 113 could determine which hosted applications 126 the email 146 might be associate with. The integration service 113 could then request a relevant calendar object from the connector 123 for the hosted application 126. In response to receiving the respective calendar object, the integration service 113 could forward the calendar object to the email client 129. The email client 129 could then create a new entry in the calendar 149 for the user, including any desired or specified reminders.

Further, the email client 129 could run a separate process that regularly removes entries from the calendar 149 on behalf of the user. For example, the email client 129 could determine the current date and/or time and compare it the due date specified for an event or task in the calendar 149. If the current date and/or time is later than the due date, the email client 129 could automatically remove the event or task from the calendar 149. Similarly, the email client 129 could determine that the current date and/or time is prior to the due date specified for an event or task. In response, the email client 129 could generate a reminder rendered within a user interface 143 to indicate to the user that he or she has an upcoming task or event that is due.

Moreover, the integration service 113 could provide a browser 133 with one or more suggested URLs. As a user provides text to the browser 133 (e.g., as input in an address bar or field), the text is provided to the links client 139 by the browser 133. The links client 139 can then determine whether the input matches any locally cached URLs 153. If no match occurs, the links client 139 could forward the text input to the integration service 113, which would relay the text input to the links service 119. Alternatively, if no match occurs, the links client 139 could provide the text input directly to the links service 119. The links service 119 could then determine if the text input matches any service cached URLs 121. If no match occurs, the links service 119 could provide the text input to one or more connectors 123, which could analyze the text input and provide a relevant URL for the respective hosted application 126.

Figure 2:
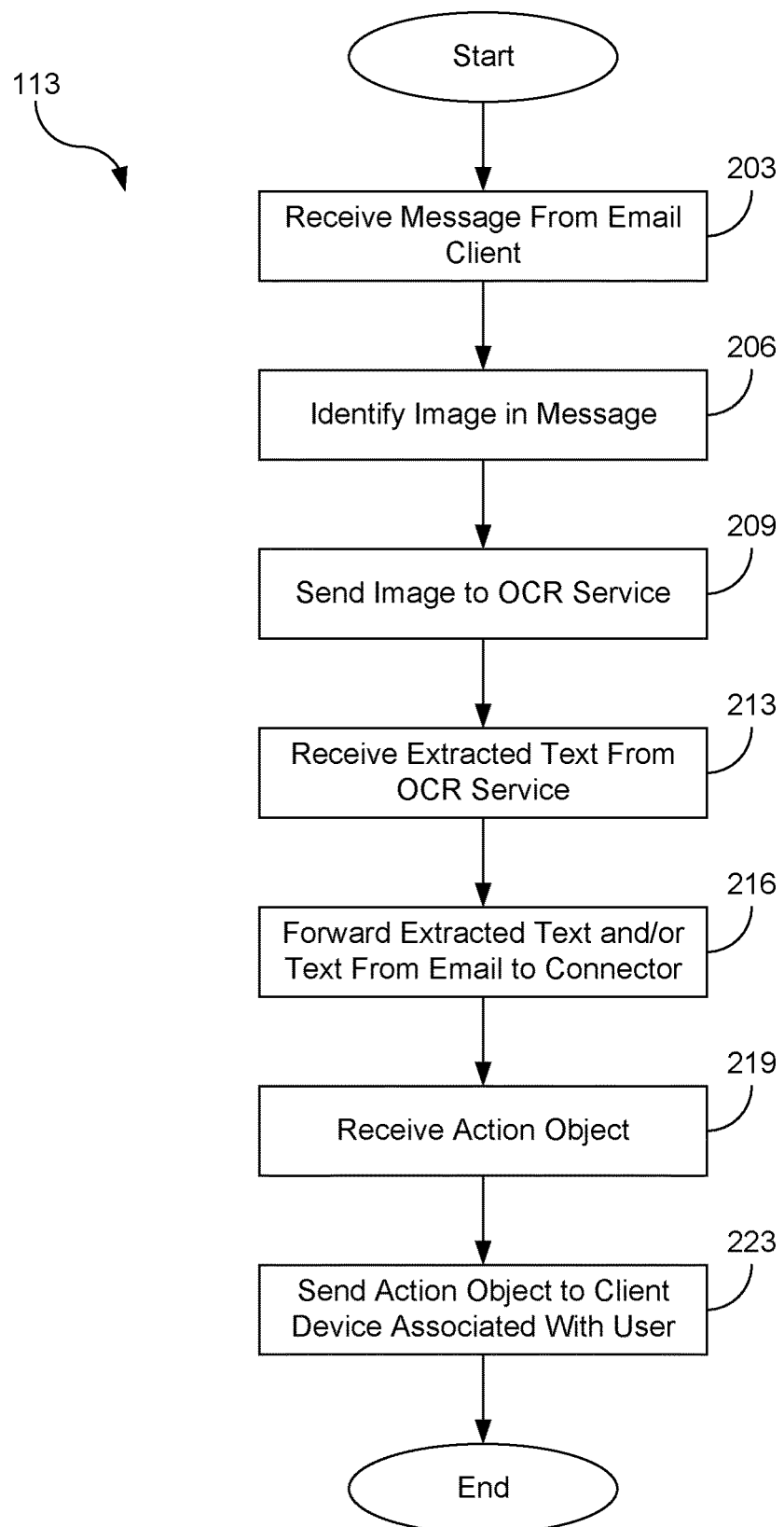
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the integration service 113. The flowchart of FIG. 2 provides merely an example of the many different types of functional arrangements that can be employed to implement the operation of the depicted portion of the integration service 113. As an alternative, the flowchart of FIG. 2 can be viewed as depicting an example of elements of a method implemented within the network environment 100.

Beginning with step 203, the integration service 113 can receive an email 146 from an email client 129. The email client 129 could, for instance, be configured to automatically forward all emails to the integration service 113 for evaluation.

Then at step 206, the integration service 113 can determine whether or not there is an image present in the body of the email 146 or attached to the email 146. This could be performed several ways. For example, the integration service 113 could search for filenames attached to the email 146 or embedded in the email 146 that end in an extension indicative of an image (e.g., ".png," ".jpg," ".gif," ".tif," etc.). Alternatively, the integration service 113 could analyze each file embedded in or attached to the email 146 and determine whether it is an image or not based on the binary of the file itself.

Next, at step 209, the integration service 113 can send any images identified at step 206 to the OCR service 116. This could be done by invoking an API call provided by the OCR service 116 and providing the image as an argument to the API call. However, other approaches could also be used. Proceeding to step 213, the integration service 113 receives text extracted from the image by the OCR service 116 in response to the request made at step 209.

Moving on to step 216, the integration service 113 can forward the email body and the extracted text received from the OCR service 116 to one or more connectors 123. In some instances, the integration service 113 could forward the email body and extracted text to each available connector 123. In other implementations, the integration service 113 could forward the email body and extracted text to a subset of connectors 123, such as those connectors associated with hosted applications 126 previously selected by the user (e.g., through the user interface of the email client 129).

Next at step 219, the integration service 113 can receive an action object from the connector 123 in response to the connector determining that the email body and/or extracted text matches an action that could be performed by the hosted application 126 associated with the connector. As a simple example, if the hosted application 126 were an issue tracker, and the extracted text contained a list of issue or matter identifiers and the body of the email asked if those matters had been resolved, the connector 123 could provide an action object listing the matter identifiers and a link or API call to the hosted application 126 to mark one or more matters as resolved or completed.

Finally, at step 223, the integration service 113 can send or forward the action object received from the connector 123 to the email client 129. The action object, when received by the email client 129, can cause the email client to render a prompt or other user interface to allow the user to perform the action specified by the action object without having to leave the user interface or user interface context of the email client 129.

Figure 3:
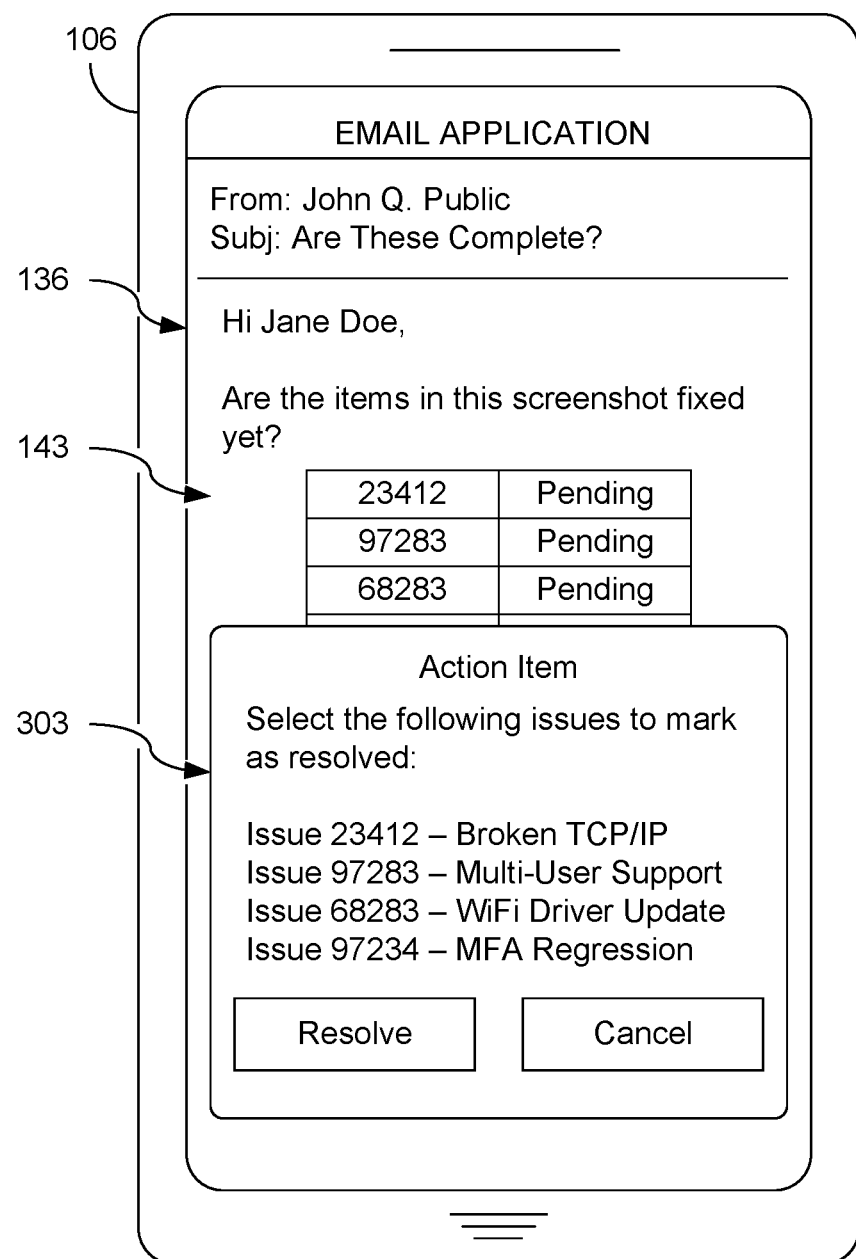
FIG. 3 is a pictorial diagram of an example user interface rendered by a client in the network environment of FIG. 1 according to various embodiments of the present disclosure.

FIG. 3 is user interface diagrams depicting the user perspective of the results of the method described previously in FIG. 2. Here, the client device 106 is rendering a user interface 143 on the display 136 of the client device 106. As shown, the user has received an email 146 that contains a screenshot with text, such as a list of issue identifiers and status identifiers for an issue tracker or similar hosted application 126. In response, the email client 129 has forwarded the email 146 to the integration service 113, which processed the email 146 and embedded image as described previously in FIG. 2. In response, the email client 129 has received an action object from the integration service 113. The email client 129 has displayed a prompt 303 for the action object, which would allow the user to mark one or more of the identified issues as resolved in the issue tracker without ever having to leave the user interface 143 of the email client 129 to interact with a separate user interface provided by the issue tracker hosted application 126.

Figure 4:
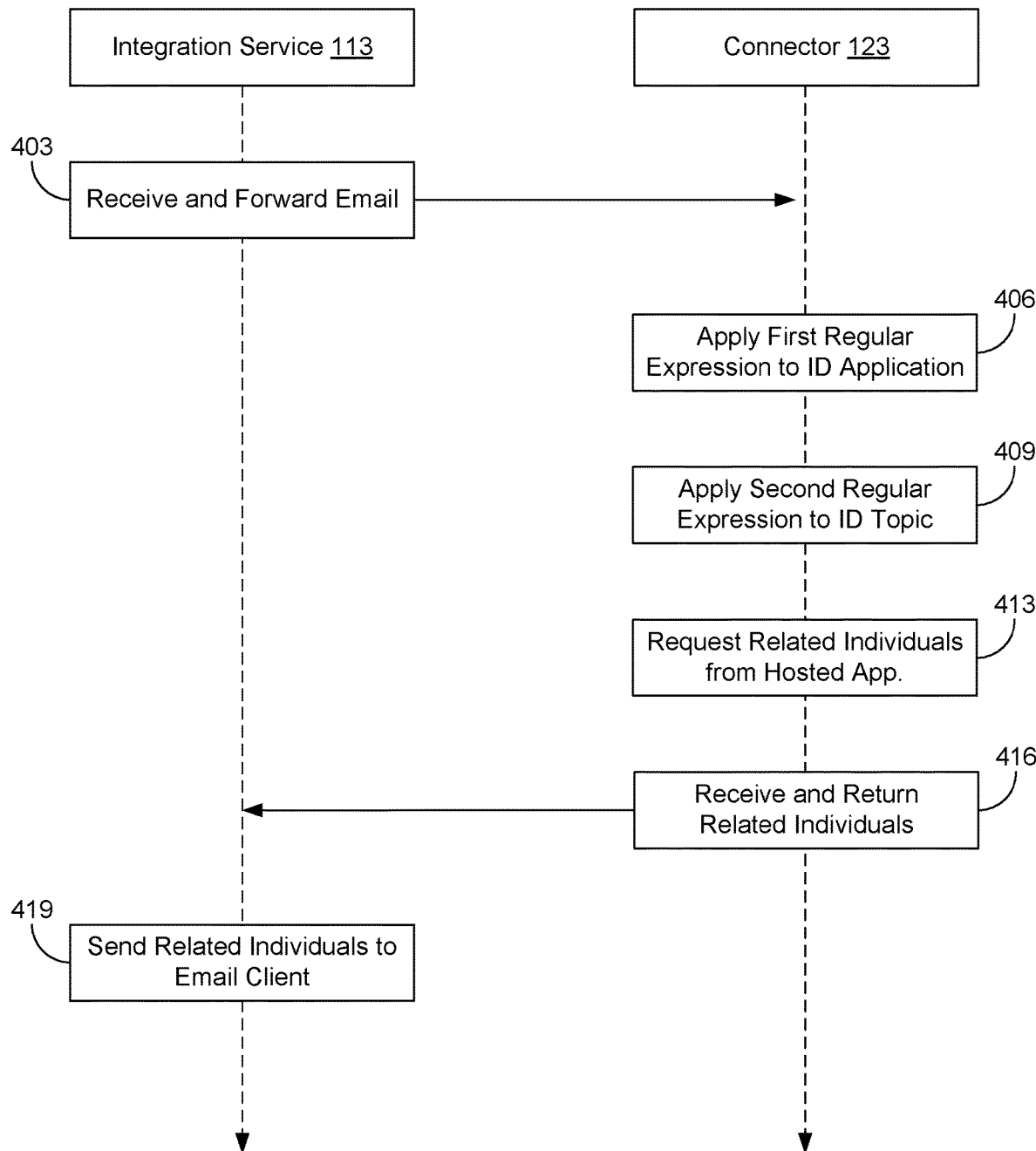
FIG. 4 is a sequence diagram illustrating one example of functionality implemented as portions of applications executed in a computing environment in the network environment of FIG. 1 according to various embodiments of the present disclosure.

Referring next to FIG. 4, shown is a sequence diagram that provides one example of the operation of portion of the integration service 113 and a connector 123. The sequence diagram of FIG. 4 provides merely an example of the many different types of functional arrangements that can be employed to implement the operation of the depicted portions of the integration service 113 and connector 123. As an alternative, the sequence diagram of FIG. 4 can be viewed as depicting an example of elements of a method implemented within the network environment 100.

Beginning with step 403, the integration service 113 can receive a draft email 146 from the email client 129. For example, as a user drafts an email 146 using the email client 129, a copy of the current version of the draft could be provided to and received by the integration service 113. The integration service 113 can then forward the draft email 146 to one or more connectors 123 for further processing, such as to obtain suggested email addresses for recipients of the draft email 146.

Then, at step 406, the connector 123 can apply a first regular expression or trained machine-learning model to the draft email 146 to determine whether the email is related to the host application 126 associated with the connector 123. For example, the connector 123 could apply a regular expression or trained machine-learning model to search for mentions of the name of the hosted application 126. As another example, the connector 123 could apply a regular expression or trained machine-learning model that searches for URLs associated with the hosted application 126. Other regular expressions or trained machine-learning models could also be used in various implementations.

Next, at step 409, the connector 123 can apply a second regular expression or trained machine-learning model to identify the topic of the draft email 146. For example, if the first regular expression or trained machine-learning model determined that the draft email 146 was related to an issue tracker, the second regular expression or trained machine-learning model might search for an issue, bug, or problem report identifier. As another example, if the first regular expression or trained machine-learning model determined that the draft email 146 was related to a customer relationship manager (CRM) application, then the second regular expression or trained machine-learning model might search for the identity of a customer, a customer support ticket identifier, or similar data. The second regular expression or machine-learning model could also be executed to identify names of individuals within the email, which can help identify the topic of the email. For example, an addressee "Jane Doe" might only be associated with particular matters.

Proceeding to step 413, the connector 123 can send a request to the hosted application 126 for one or more recipients related to the topic identified by the second regular expression or trained machine-learning model. For example, if the connector 123 used the second regular expression or trained machine-learning model to identify a specific issue, bug, or problem report identifier, the connector 123 could send a request to the hosted application 126 for the names and email addresses of those individuals associated with the particular issue, bug, or problem report identifier. As another example, if the connector 123 used the second regular expression or trained machine-learning model to identify a particular customer support ticket, the connector 123 could send a request to the hosted application 126 for the names and email addresses of those individuals associated with the particular customer support ticket. Other connectors 123 may send other types of requests for other types of hosted applications 126, depending on the particular implementation of the present disclosure.

Moving on to step 416, the connector 123 can receive the names, email addresses, and potentially other information for one or more individuals associated with the topic. For example, the connector 123 could receive the names and email addresses associated with a problem report from an issue tracker, or it could receive the names and emails associated with a customer support ticket from a CRM platform. After receiving the names and email addresses from the hosted application 126, the connector 123 can return them to the integration service 113.

Then, at step 419, the integration service 113 can forward on the names and email addresses from the hosted application 126 to the email client 129. Although the process may end at this point, it could be repeated multiple times. This could occur, for example, as a user updates the email 146 he or she is drafting. As changes to the email are made, the process could be repeated using updated drafts.

FIG. 5 is user interface diagrams depicting the user perspective of the results of the sequence diagram described previously in FIG. 4. Here, the email client 129 can render a user interface 143 that lists one or more email addresses suggested as a result of the sequence diagram depicted in FIG. 4. In some implementations, the email client 129 could provide the body of the email 146 to the integration service 113 on a periodic basis. In other implementations, the email client 129 could provide the body of the email 146 to the integration service 113 in response to a triggering event, such as a user selecting a "To" or "CC" field in the user interface, which would indicate that the user is will soon select or specify recipients. Likewise, the email client 129 could depict the suggested recipients continuously or periodically (e.g., as the user drafts the email 146), or in response to a triggering event, such as a user selecting a "To" or "CC" field in the user interface, which would indicate that the user is will soon select or specify recipients. Moreover, the email client 129 could render an indication of how individual ones of the suggested recipient email addresses are related to the topic of the email 146. For example, if the email 146 were related to a problem report in an issue tracker, the titles or roles of individuals associated with the problem report (e.g., team lead, reviewer, issuer reporter, etc.) could also be listed.

Figure 6:
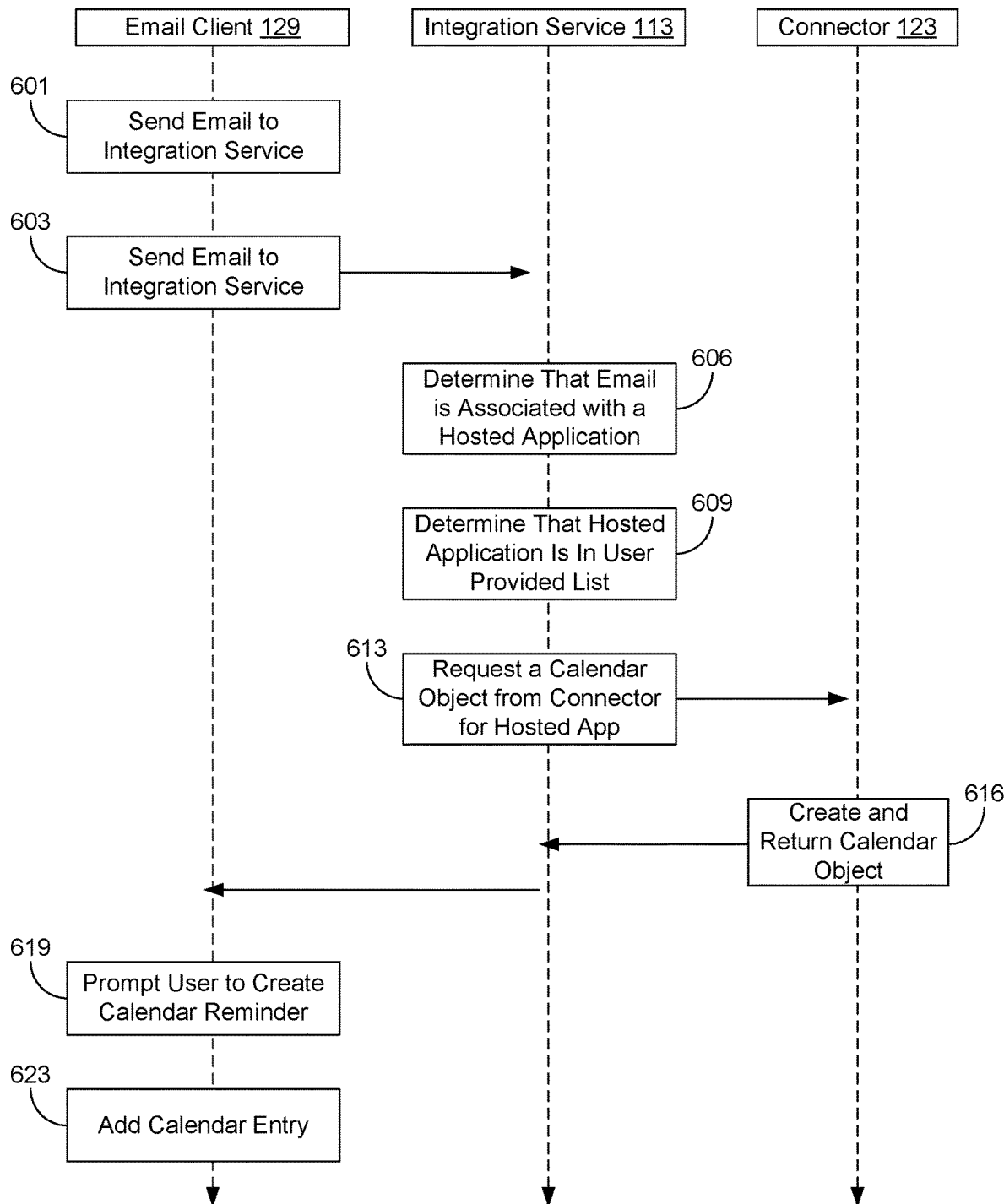
FIG. 6 is a sequence diagram illustrating one example of functionality implemented as portions of applications executed in a computing environment in the network environment of FIG. 1 according to various embodiments of the present disclosure.

Referring next to FIG. 6, shown is a sequence diagram that provides one example of the operation of and interactions between the email client 129, the integration service 113, and the connector 123. The sequence diagram of FIG. 6 provides merely an example of the many different types of functional arrangements that can be employed to implement the operation of the depicted portions of the email client 129, integration service 113, and the connector 123. As an alternative, the sequence diagram of FIG. 6 can be viewed as depicting an example of elements of a method implemented within the network environment 100.

Beginning at step 601, the email client 129 can receive an email 146 from a hosted application 126. The email may be associated with a task or deadline that the user needs to perform, such as addressing a customer support ticket created or updated in a CRM hosted application 126, investigating or resolving an issue or trouble ticket in an issue tracker hosted application 126, or some other task. Accordingly, it may be useful for the email client 129 to automatically add an entry in the calendar 149 of the user and remind the user periodically of the upcoming deadlines.

Subsequently, at step 603, the email client 129 can send an email 146 that is has received to the integration service 113. This could be done, for example, for each email 146 received by the email client 129 at step 601 or for specific emails 146 received at step 601 (e.g., emails 146 received from sources or associated with host applications 126 previously specified by the user).

Then at step 606, the integration service 113 can determine which hosted application 126 the email 146 is associated with. For example, the integration service 113 could determine that the email 146 was sent from a particular hosted application 126 based on the sender address associated with the email 146. As another example, the email client 129 could have specified to the integration service 113 the identity of the hosted application 126.

Next at step 609, the integration service 113 can (in some implementations) compare the identity of the hosted application 126 associated with the email 146 with a user provided list of hosted applications 126. The user provided list of hosted applications 126 could be used, for example, to determine whether the user wishes to have calendar events or reminders automatically added to the calendar 149 of the user. If the hosted application 126 associated with the email 146 received from the email client 129 is in included in the user provided list, then the process would proceed.

Moving to step 613, the integration service 113 can request a calendar object from the connector 123 for the hosted application 126 associated with the email. This can be done using a variety of approaches. One approach would be to provide the email 146 to the connector 123. The connector 123 could then analyze the email 146 and return an appropriate calendar object. As another example, the integration service 113 could analyze the email 146 to identify an event. For example, if the email 146 is associated with an issue tracker or bug tracker, the integration service 113 could apply a regular expression or trained machine-learning model to search for a ticket or issue identifier and provide that in a request to the connector 123. A regular expression or trained machine-learning model could similarly be used for other types of hosted applications 126.

Proceeding to step 616, the connector 123 can create and return a calendar object on behalf of the hosted application 126. For example, if the connector 123 were provided with a copy of the email 146, the connector could apply a regular expression or trained machine-learning model to the email to identify a relevant topic, task or action to perform. For example, if there were a customer support ticket number in the email 146, the regular expression or trained machine-learning model for a connector 123 for a CRM hosted application 126 could identify the ticket number, search for the appropriate records for the ticket number to identify any current or upcoming due dates, deadlines, or other action items. The connector 123 could then create a calendar object that includes a label for the task (e.g., a name or the task), a deadline for the task, and potentially other information. Once created, the connector 123 could return the calendar object to the integration service 113, which would in turn return the calendar object to the email client 129.

Then at step 619, the email client 129 can generate a prompt within the user interface 143 to confirm with the user whether he or she wishes to have the email client 129 create an entry in calendar 149 based off of the email 146 received at step 601. If the user declines to have an entry created in his or her calendar 149, then the process would end. However, if the user confirms, then the process would proceed to step 623, where the email client 129 would add create an entry in the calendar 149 using the information provided in the calendar object created at step 616 by the connector 123.

Figure 7:
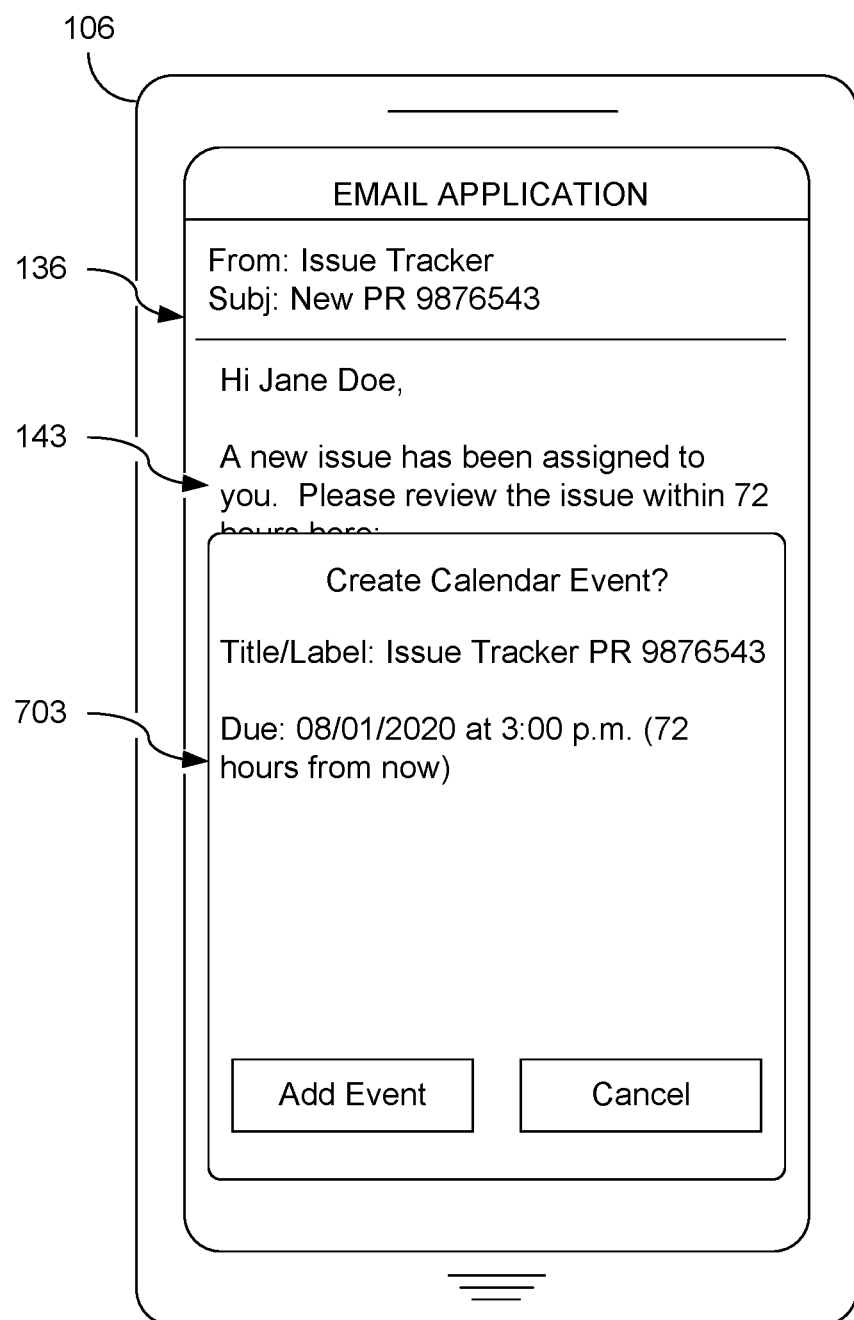
FIG. 7 is a pictorial diagram of an example user interface rendered by a client in the network environment of FIG. 1 according to various embodiments of the present disclosure.

FIG. 7 is user interface diagrams depicting the user perspective of the results of the method described previously in FIG. 6. Here, the client device 106 is rendering a user interface 143 on the display 136 of the client device 106. As shown, the user has received an email 146 from a hosted application 126. The email indicates that the user has a task to be accomplished within a predefined period of time. In response, the email client 129 has forwarded the email 146 to the integration service 113, which processed the email 146 as described previously in FIG. 6. In response, the email client 129 has received a calendar object from the integration service 113. The email client 129 has displayed a prompt 703 for creating an entry in the calendar 149 using the information provided in the calendar object, which would allow the user to have his or her calendar 149 updated without ever having to leave the current user interface 143 of the email client 129 to interact with a separate user interface 143.

Figure 8:
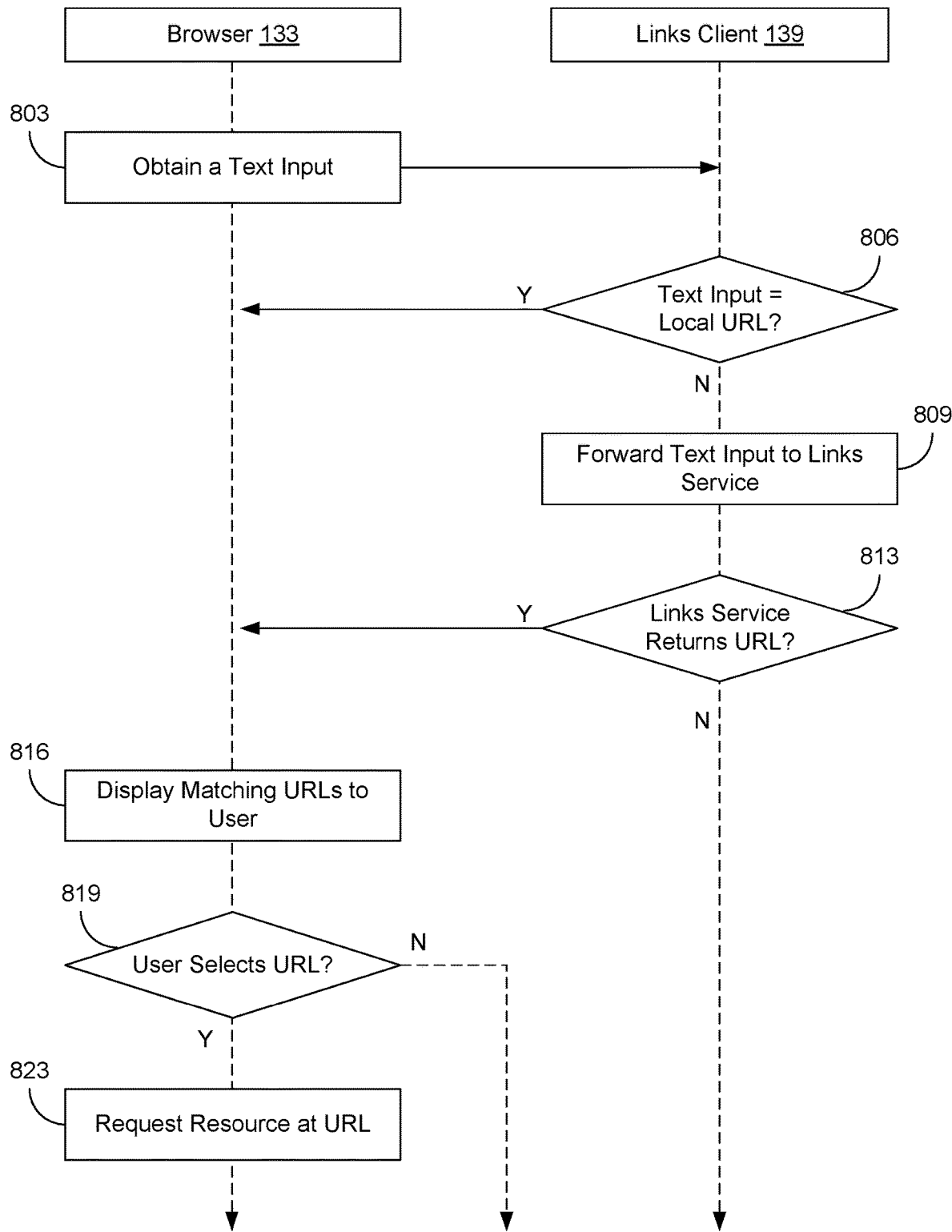
FIG. 8 is a sequence diagram illustrating one example of functionality implemented as portions of applications executed in a computing environment in the network environment of FIG. 1 according to various embodiments of the present disclosure.

Referring next to FIG. 8, shown is a sequence diagram that provides one example of the operation of and interactions between portions of the browser 133 and the links client 139. As previously stated, the links client 139 can be implemented as a component of the browser 133 in some implementations. The sequence diagram of FIG. 8 provides merely an example of the many different types of functional arrangements that can be employed to implement the operation of the depicted portions of the browser 133 and the links client 139. As an alternative, the flowchart of FIG. 8 can be viewed as depicting an example of elements of a method implemented within the network environment 100.

Beginning with step 803, the browser 133 can obtain a text input from a user. For example, if a user inputs text in an address bar of a browser 133, the browser 133 could obtain or record the text input. The browser 133 can then provide the text input to the links client 139.

Then at step 806, the links client 139 can determine whether the text input matches one or more locally cached URLs 153. For example, the links client 139 could apply a regular expression or trained machine-learning model to see if a domain or subdomain of a locally cached URL 153 matches a portion of the text input. As another example, the links client 139 could apply a regular expression or trained machine-learning model to determine whether a path or query parameter of a locally cached URL 153 matches the text input. If a match is found, the matching locally cached URL 153 can be returned to the browser 133 and the process can skip to step 816. If no match is found, then process can proceed to step 809.

If execution proceeds to step 809, the links client 139 can forward the text input from step 803 to a links service 119. In some implementations, the links client 139 could provide the text input directly to the links service 119. In other implementations, the links client 139 could provide the text input to the integration service 113, which would relay the text input to the links service 119. As subsequently described in FIG. 9, the links service 119 can determine whether the text input matches a URL cached by the links service 119 or if it matches a URL of a hosted application 126.

Moving on to step 813, the links client 139 can determine whether the links service 119 returns one or more matching URLS. If a matching URL is returned, then the process can proceed to step 816. If no matching URLs are returned, then the process can end.

If execution continues to step 816, the browser 133 can cause the matching URLs identified by the links client 139 to be rendered within a user interface 143 on a display 136 of the client device 106.

Next at step 819, the browser 133 can determine whether the user has selected one of the URLs presented at step 816 in the user interface 143. If a user selects a URL, then the process proceeds to step 823, where the browser 133 requests the resource located at the URL. If the user fails to select one of the matching URLs displayed within the user interface 143, then the process ends.

Figure 9:
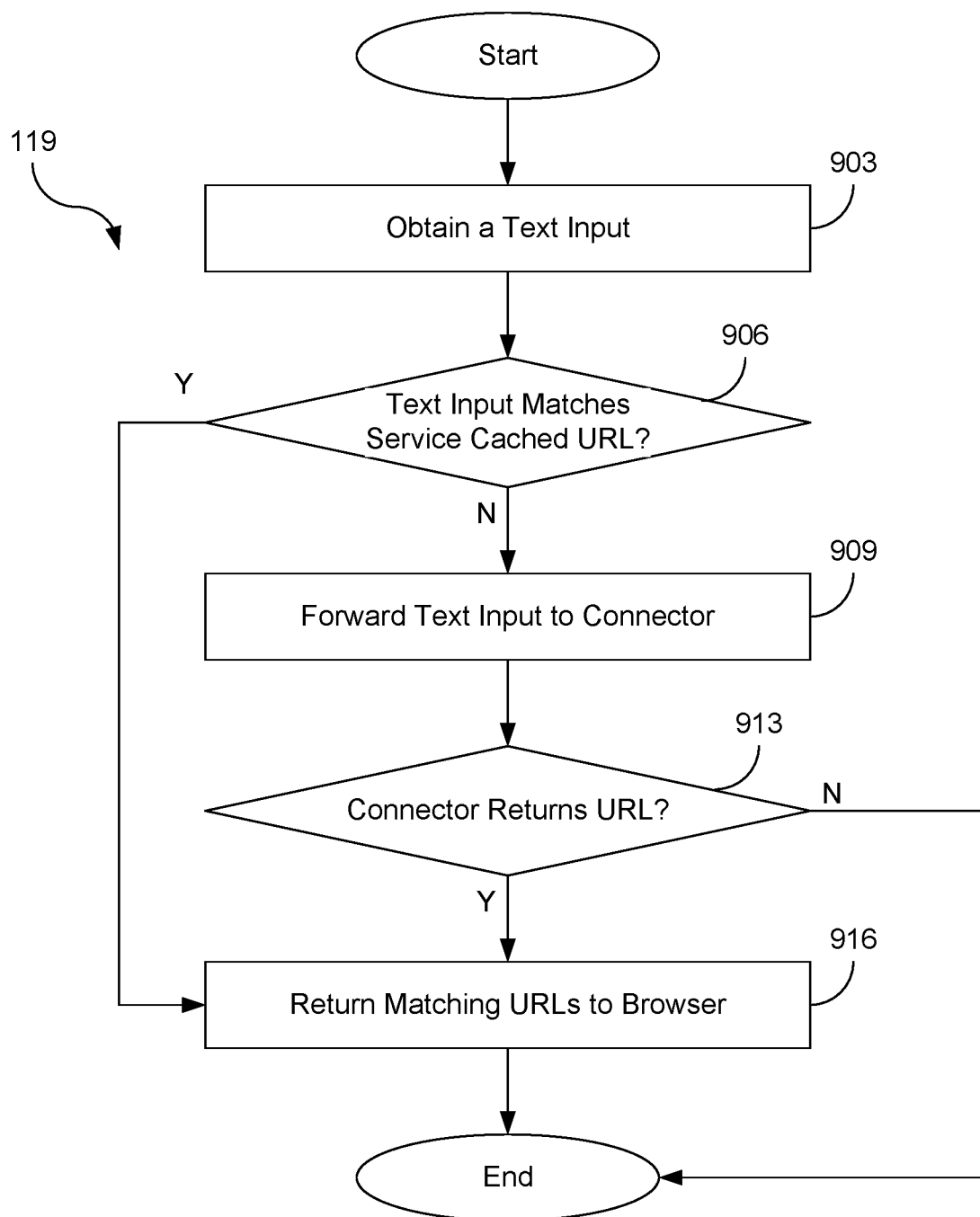
FIG. 9 is a flowchart illustrating one example of functionality implemented as portions of an application executed in a computing environment in the network environment of FIG. 1 according to various embodiments of the present disclosure.

Referring next to FIG. 9, shown is a flowchart that provides one example of the operation of a portion of the links service 119. The flowchart of FIG. 9 provides merely an example of the many different types of functional arrangements that can be employed to implement the operation of the depicted portion of the links service 119. As an alternative, the flowchart of FIG. 9 can be viewed as depicting an example of elements of a method implemented within the network environment 100.

Beginning with step 903, the links service 119 receives or otherwise obtains a text input. For example, the links service 119 may receive the text input directly from a links client 139 or from the integration service 113 on behalf of the links client 139, as previously discussed in the description of FIG. 8.

Next at step 906, the links service 119 can determine whether the text input matches one or more service cached URLs 121 maintained by the links service 119. For example, the links service 119 could apply a regular expression or trained machine-learning model to see if a domain or subdomain of a service cached URL 121 matches a portion of the text input. As another example, the links service 119 could apply a regular expression or trained machine-learning model to determine whether a path or query parameter of a service cached URL 121 matches the text input. If a match is found, the matching service cached URL 121 can be returned to the browser 133 and the process can skip to step 916. If no match is found, then process can proceed to step 909.

If the process proceeds to step 909, the links service 119 can send the text input to one or more respective connectors 123. The connectors 123 can then apply one or more regular expressions or trained machine-learning models to the text input to determine whether the text input matches a URL or other resource associated with or maintained by a respective hosted application 126. The application of a regular expression or trained machine-learning model by the connector 123 can be similar to the processes previously described as being used by the links client 139 and the links service 119. In some implementations, the user may have previously specified that the user only wishes to receive suggested URLs for specific hosted applications 126, in which case the links service 119 could forward the text input to those respective connectors 123 specifically.

Moving on to step 913, the links service 119 can determine whether one or more URLs were returned by one or more connectors 123. If no URLs are returned, the process ends. However, if any matching URLs were identified at step 906 or by a connector 123 at steps 909 and 913, then the links service 119 could return the identified URLS to the links client 139 at step 916. In those instances where the connector 123 returned a URL, the URL could also be saved or cached as a service cached URL 121 for expediting future requests from the links client 139.

Figure 10:
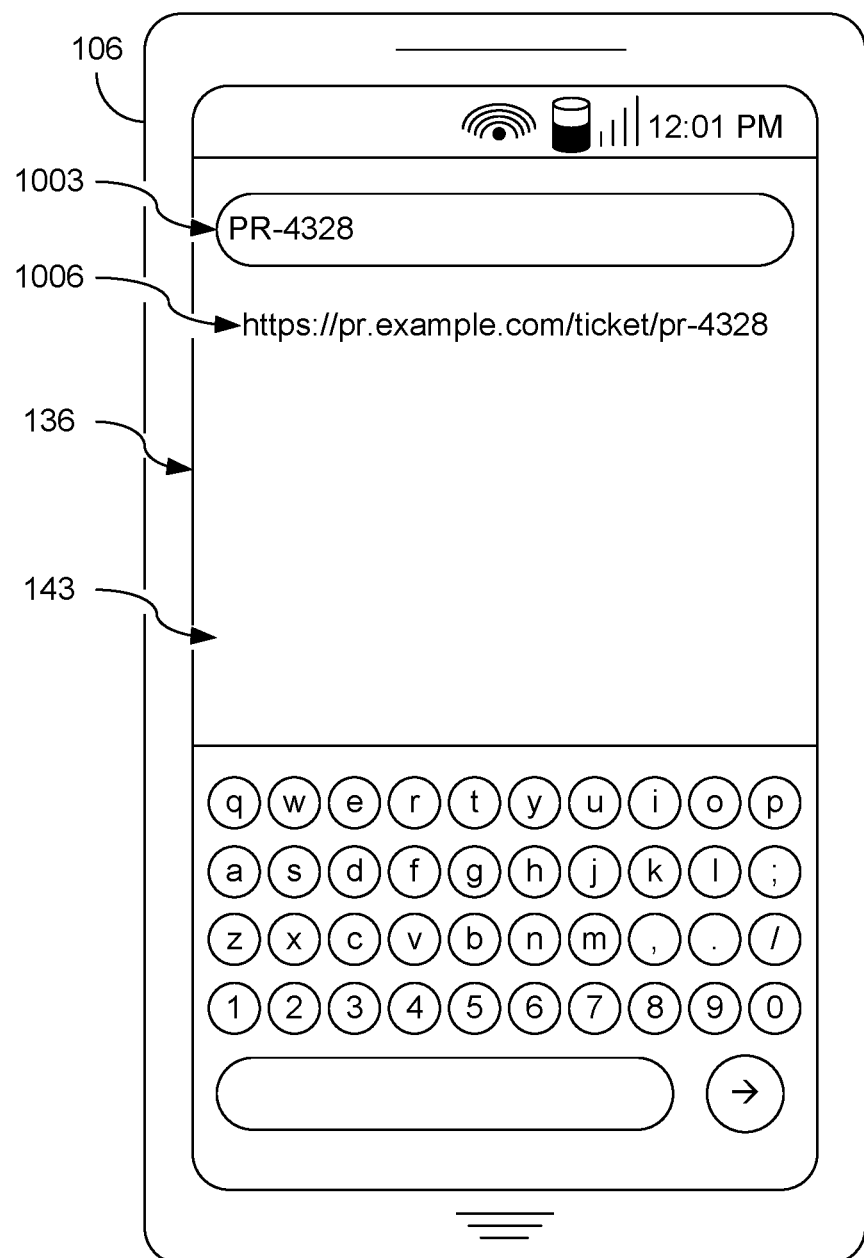
FIG. 10 is a pictorial diagram of an example user interface rendered by a client in the network environment of FIG. 1 according to various embodiments of the present disclosure.

FIG. 10 is user interface diagrams depicting the user perspective of the results of the methods described previously in FIGS. 8 and 9. Here, the client device 106 is rendering a user interface 143 on the display 136 of the client device 106. As shown, the user is typing text into an address bar 1003 that is part of the user interface 143 of a browser 133. As the user types, the browser 133 and the links client 139 have identified a suggested URL 1006 using the process depicted in FIGS. 8 and 9. The could then select the suggested URL 1006 to cause the browser to request the resource located at the suggested URL 1006 instead of providing further text. As shown, a URL or partial URL need not be provided, as a parameter or path of a URL could be provided instead (e.g., where the parameter or path contains a unique identifier for a resource of a hosted application 126).

Figure 11:
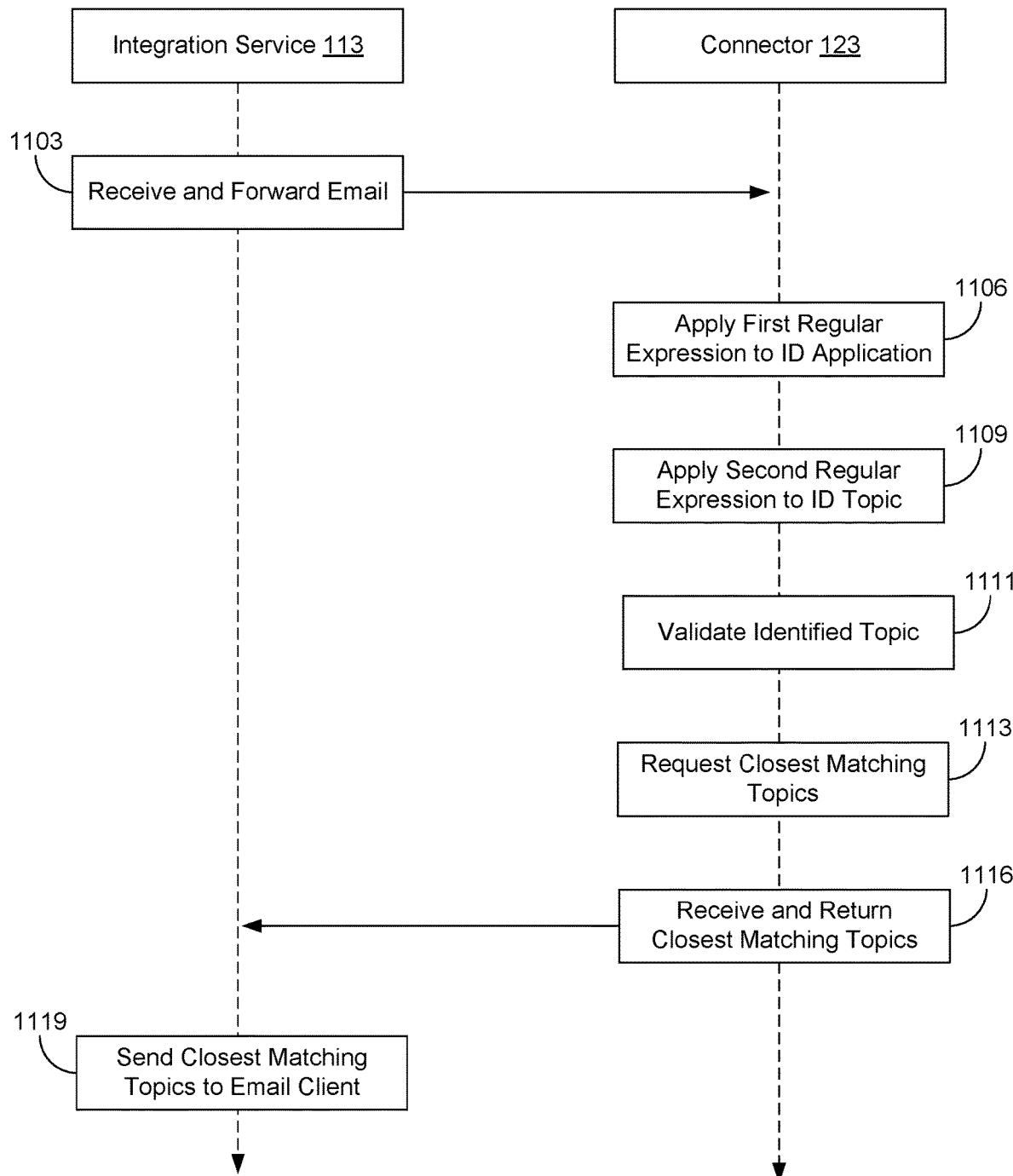
FIG. 11 is a sequence diagram illustrating one example of functionality implemented as portions of applications executed in a computing environment in the network environment of FIG. 1 according to various embodiments of the present disclosure.

Referring next to FIG. 11, shown is a sequence diagram that provides one example of the operation of portion of the integration service 113 and a connector 123. The sequence diagram of FIG. 11 provides merely an example of the many different types of functional arrangements that can be employed to implement the operation of the depicted portions of the integration service 113 and connector 123. As an alternative, the sequence diagram of FIG. 11 can be viewed as depicting an example of elements of a method implemented within the network environment 100.

Beginning with step 1103, the integration service 113 can receive a draft email 146 from the email client 129. For example, as a user drafts an email 146 using the email client 129, a copy of the current version of the draft could be provided to and received by the integration service 113. The integration service 113 can then forward the draft email 146 to one or more connectors 123 for further processing, such as to obtain suggested email addresses for recipients of the draft email 146.

Then, at step 1106, the connector 123 can apply a first regular expression or trained machine-learning model to the draft email 146 to determine whether the email is related to the host application 126 associated with the connector 123. For example, the connector 123 could apply a regular expression or trained machine-learning model to search for mentions of the name of the hosted application 126. As another example, the connector 123 could apply a regular expression or trained machine-learning model that searches for URLs associated with the hosted application 126. Other regular expressions or trained machine-learning models could also be used in various implementations.

Next, at step 1109, the connector 123 can apply a second regular expression or trained machine-learning model to identify the topic of the draft email 146. For example, if the first regular expression or trained machine-learning model determined that the draft email 146 was related to an issue tracker, the second regular expression or trained machine-learning model might search for an issue, bug, or problem report identifier. As another example, if the first regular expression or trained machine-learning model determined that the draft email 146 was related to a customer relationship manager (CRM) application, then the second regular expression or trained machine-learning model might search for the identity of a customer, a customer support ticket identifier, or similar data.

Then at step 1111, the connector 123 can validate or cause the topic identified at step 1109 to be validated. For example, if the topic were an identifier for a bug, issue, or problem report, the connector 123 could execute a search with topic to see if it returned a valid ticket bug, issue, or problem report ticket. If a valid ticket were returned, the process would end. However, if not valid tickets were returned, then the connector 123 could determine that the identified topic was erroneous or otherwise invalid, which could be cause by a typographical, clerical, or similar error.

Proceeding to step 1113, the connector 123 can send a request to the hosted application 126 for one or more closest matching topics. For example, if the connector 123 used the second regular expression or trained machine-learning model to identify a specific issue, bug, or problem report identifier, the connector 123 could send a request to the hosted application 126 for the names and email addresses of those issue, bug, or problem reports with a similar identifier (such as an identifier that differed by a single digit or character). As another example, if the connector 123 used the second regular expression or trained machine-learning model to identify a particular customer support ticket, the connector 123 could send a request to the hosted application 126 for those customer support tickets that were a closest match (e.g., customer support tickets that differed by a single digit or character). Other connectors 123 may send other types of requests for other types of hosted applications 126, depending on the particular implementation of the present disclosure.

Moving on to step 1116, the connector 123 can receive the closest matching topics associated with the identified topic. For example, the connector 123 could receive the ticket identifiers from an issue tracker for bugs, issues, or problem reports, where the ticket identifiers differed by a single character or digit. As another example, the connector 123 could receive those customer support tickets from a CRM platform that differed by a single character or digit from the ticket number identified at step 1109 and validated at 1111. The connector 123 can return the identifiers of the closest matching topics to the integration service 113.

Then, at step 1119, the integration service 113 can forward on the identifiers of the closest matching topics from the hosted application 126 to the email client 129, which the email client 129 could the present to the user. Although the process may end at this point, it could be repeated multiple times. This could occur, for example, as a user updates the email 146 he or she is drafting. As changes to the email are made, the process could be repeated using updated drafts.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, I claim:

1. A system, comprising:
a computing device comprising a processor and a memory; and
machine-readable instructions stored in the memory that, when executed by the processor, cause the computing device to at least:
receive an email from an email client;
identify an image that is a component of the email;
send the image to an optical character recognition (OCR) service;
receive extracted text from the OCR service;
request an action object from a connector for an application, the action object representing a potential action that could be performed with the application based on the extracted text from the OCR service; and
send the action object to the email client, wherein the email client is configured to display a prompt allowing a user to perform the action represented by the action object.

2. The system of claim 1, wherein the machine-readable instructions that request the action object from the connector provide the email and the extracted text to the connector.

3. The system of claim 1, wherein the machine-readable instructions that cause the computing device to identify that an image is a component of the email further cause the computing device to apply a regular expression to the email that matches a file extension for the image.

4. The system of claim 1, wherein the action object is requested from a connector for an application that has been previously specified by the user.

5. The system of claim 1, wherein the image is embedded in a body of the email.

6. The system of claim 1, wherein the image is attached to the email.

7. A non-transitory, computer-readable medium comprising machine-readable instructions that, when executed by a process of a computing device, cause the computing device to at least:
receive an email from an email client;
identify an image that is a component of the email;
send the image to an optical character recognition (OCR) service;
receive extracted text from the OCR service;
request an action object from a connector for an application, the action object representing a potential action that could be performed with the application based on the extracted text from the OCR service; and send the action object to the email client, wherein the email client is configured to display a prompt allowing a user to perform the action represented by the action object.

8. The non-transitory, computer-readable medium of claim 7, wherein the machine-readable instructions that request the action object from the connector provide the email and the extracted text to the connector.

9. The non-transitory, computer-readable medium of claim 7, wherein the machine-readable instructions that cause the computing device to identify that an image is a component of the email further cause the computing device to apply a regular expression to the email that matches a file extension for the image.

10. The non-transitory, computer-readable medium of claim 7, wherein the action object is requested from a connector for an application that has been previously specified by the user.

11. The non-transitory, computer-readable medium of claim 7, wherein the image is embedded in a body of the email.

12. The non-transitory, computer-readable medium of claim 7, wherein the image is attached to the email.

13. A computer-implemented method, comprising:
receiving an email from an email client;
identifying an image that is a component of the email;
sending the image to an optical character recognition (OCR) service;
receiving extracted text from the OCR service;
requesting an action object from a connector for an application, the action object representing a potential action that could be performed with the application based on the extracted text from the OCR service; and
sending the action object to the email client, wherein the email client is configured to display a prompt allowing a user to perform the action represented by the action object.

14. The computer-implemented method of claim 13, wherein requesting the action object from the connector further comprises providing the email and the extracted text to the connector.

15. The computer-implemented method of claim 13, wherein identifying that an image is a component of the email further comprises applying a regular expression to the email that matches a file extension for the image.

16. The computer-implemented method of claim 13, wherein the action object is requested from a connector for an application that has been previously specified by the user.

17. The computer-implemented method of claim 13, wherein the image is embedded in a body of the email.

18. The computer-implemented method of claim 13, wherein the image is attached to the email.

* * * * *